United States Patent [19]

Goldman et al.

[11] Patent Number: 5,360,680
[45] Date of Patent: Nov. 1, 1994

[54] MECHANICALLY RECHARGEABLE ELECTRIC BATTERIES AND ANODES FOR USE THEREIN

[75] Inventors: Arnold J. Goldman, Jerusalem; Eugeny Pecherer, Netanya; Jonathan R. Goldstein, Jerusalem; Joseph Biran, Raanana; Menachem Korall, Jerusalem; Arye Meitav, Rishon Le'Zion, all of Israel

[73] Assignee: Electric Fuel Limited, Jerusalem, Israel

[21] Appl. No.: 964,644

[22] Filed: Oct. 21, 1992

Related U.S. Application Data

[63] Continuation-in-part of Ser. No. 636,606, Dec. 31, 1990, Pat. No. 5,196,275.

[30] Foreign Application Priority Data

Feb. 10, 1992 [IL] Israel ..................................... 100903

[51] Int. Cl.$^5$ .............................................. H01M 4/02
[52] U.S. Cl. ........................................ 429/27; 429/17; 429/19; 429/34
[58] Field of Search .................... 429/27, 29, 30, 717, 429/34, 101

[56] References Cited

U.S. PATENT DOCUMENTS

| | | | |
|---|---|---|---|
| 3,630,785 | 12/1971 | Jagicl | 429/29 |
| 3,645,794 | 2/1972 | Hamlen | 429/28 |
| 3,716,413 | 2/1973 | Eisner | 429/21 |
| 3,847,671 | 11/1974 | Leparulo et al. | 429/15 |
| 4,127,701 | 11/1978 | Synions et al. | |
| 4,842,963 | 6/1989 | Ross | 429/21 |
| 4,908,281 | 3/1990 | O'Callaghan | 429/27 |
| 4,925,744 | 5/1990 | Niksa | 429/27 |
| 4,950,561 | 8/1990 | Niksa | 429/27 |
| 4,957,826 | 9/1990 | Cheiky | 429/27 |
| 5,006,424 | 4/1991 | Evans et al. | 429/15 |
| 5,206,096 | 4/1993 | Goldstein | 429/27 |

FOREIGN PATENT DOCUMENTS

| | | |
|---|---|---|
| 0047792 | 3/1982 | European Pat. Off. . |
| 0371883 | 6/1990 | European Pat. Off. . |
| 354021 | 5/1905 | France . |
| 637746 | 7/1927 | France . |
| 1573040 | 2/1968 | France . |
| 65223 | 9/1972 | France . |
| 2663162 | 12/1991 | France . |
| 59-114757 | 7/1984 | Japan . |
| 3184277 | 8/1991 | Japan . |
| 14050 | 6/1911 | United Kingdom . |
| 92029964 | 2/1992 | WIPO . |

*Primary Examiner*—Jose' G. Dees
*Assistant Examiner*—Samuel Barts
*Attorney, Agent, or Firm*—Helfgott & Karas

[57] ABSTRACT

A mechanically rechargeable electric battery includes at least one electrical cell which has a pair of generally planar outer electrodes configured to define therebetween an interior space for an electrical power storage medium, and inner electrodes removably-mounted between the pair of outer electrodes so as to be in electrically conductive contact with the electrical power storage medium and configured to provide mechanical support for the electrical power storage medium and to be removable as a unit therewith from the cell. The cell is a metal-gas battery cell and the electrical power storage medium contained in the interior space contains a slurry containing active porous zinc particles saturated with an electrolyte solution. The outer electrodes define an opening communicating with the interior space, and the inner electrodes are configured for their removal from the interior space, via the opening, thereby enabling the simultaneous removal of the inner electrodes and the slurry from the interior space.

6 Claims, 14 Drawing Sheets

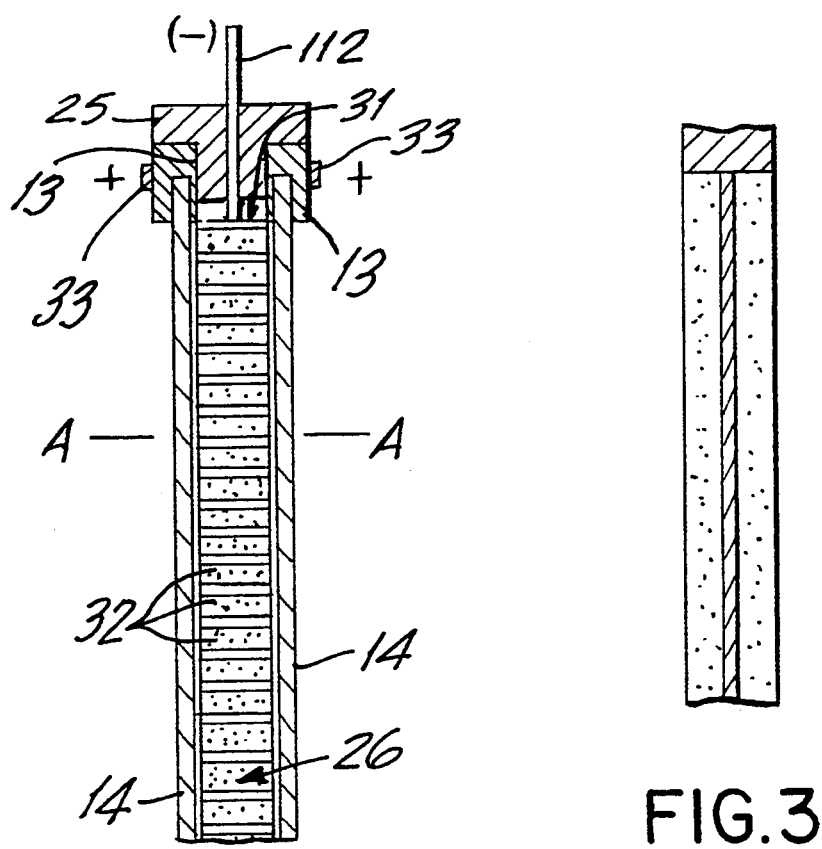
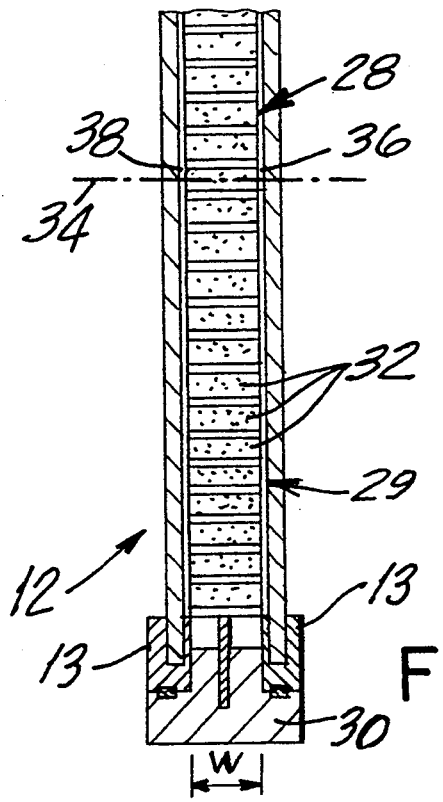
FIG.3
FIG.2

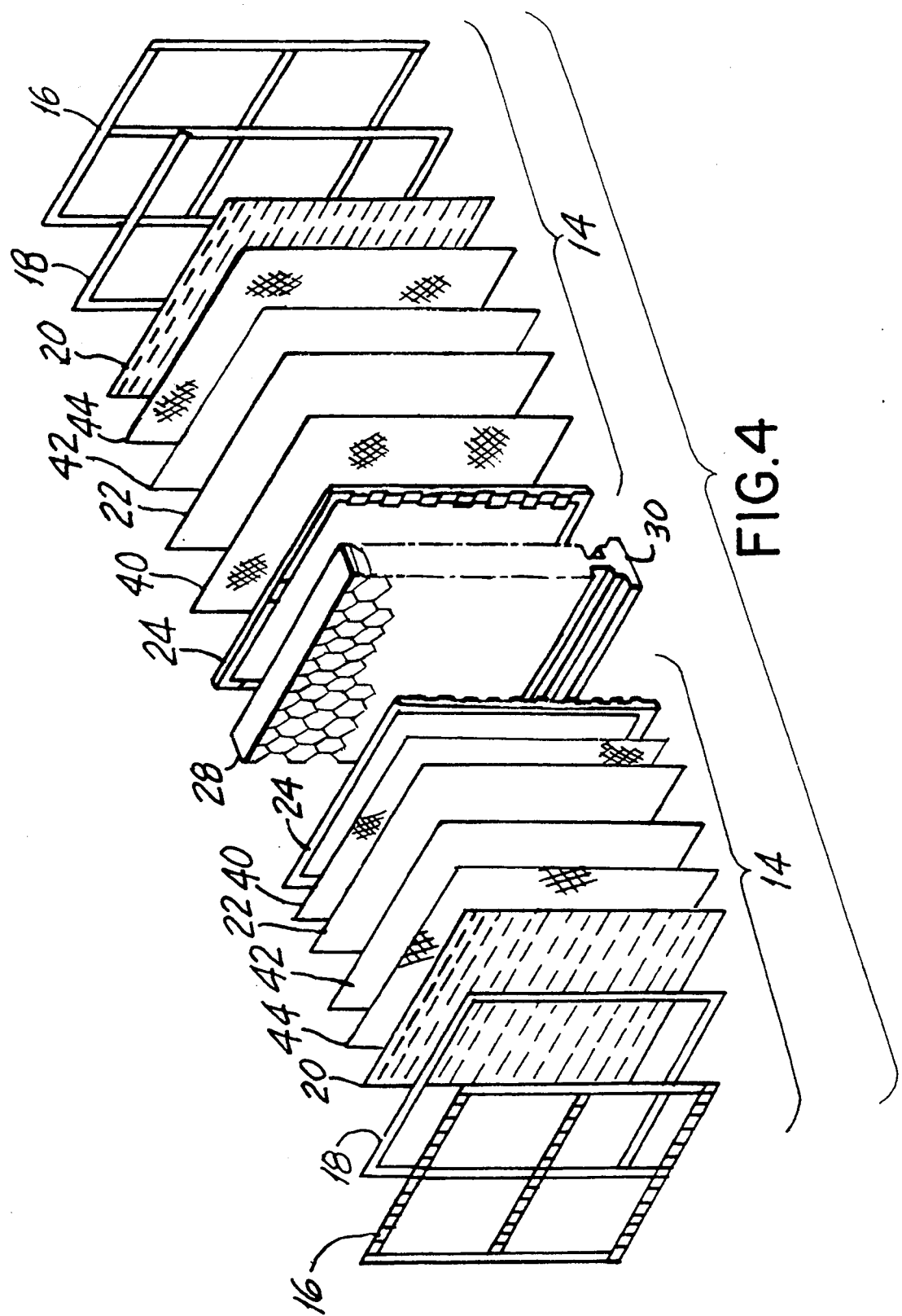

MECHANICALLY RECHARGEABLE ELECTRIC BATTERIES AND ANODES FOR USE THEREIN

The present specification is a continuation-in-part of pending U.S. Ser. No. 07/636,606 filed Dec. 31, 1990, now U.S. Pat. No. 5,196,295.

The present invention relates to mechanically rechargeable electric batteries generally, and, more particularly, to mechanically rechargeable electric batteries useful in electric vehicles, improved anodes for use therein and to a mechanically rechargeable electric battery system utilizing the same.

Over the years, various proposals have been made for electrically powered vehicles. To date, for a number of reasons, electric vehicle systems have yet to become commercial for urban and highway applications.

Metal-air and particularly zinc-air battery systems are known in the art and due to their high energy densities, relative safety of operation and the possibility of ready mechanical recharging, such systems have been suggested as a power source for electrically propelled automotive vehicles. To date, for various reasons, such systems have yet to meet with significant commercial success.

One of the principle drawbacks of battery systems as a power source for automotive vehicle propulsion, and particularly zinc-air battery systems, resides in the difficulty in achieving the combination of both a high continuous current drain, such as is needed for extended uphill driving, and short term high peak power output such as is needed for quick acceleration, while at the same time maintaining a high energy density and facilitating rapid rechargeability.

On the one hand, in order to achieve high continuous current drain a large reservoir of active anode material is needed.

Due to space and other considerations this is generally best achieved by incorporation of a highly porous active anode element having large-surface active anodic material.

By contrast, in order to achieve high peak power output, i.e. the ability to provide a very high level of power for short bursts of time, studies have found that a tight interparticulate structure of the active anodic material is advantageous. This results in a low porosity with known powdered anodes and can drastically reduce the current capacity of the battery.

To date, in known-in-the-art battery systems much emphasis has been placed on achieving high capacity. Zinc anodes in various battery systems are generally formed in one of two broad families of processes: According to one family, particularly applicable to primary alkaline batteries, the anodes are constructed from finely powdered zinc typically produced by a thermal atomization process. The resultant zinc powder typically has a particulate size distribution of between 0.0075 to 0.8 mm and a surface area of between 0.2–0.4 $m^2/g$; it is generally combined with mercury, sodium carboxymethyl cellulose and KOH solution to form a gelled mass readily extruded into an anode form. Alternatively the powdered zinc may be sintered, or wetted with mercury and pressed into a plate. Porosity of the anode may be controlled by use of removable pore forming materials such as $NH_4Cl$. The density of the zinc anode material precursor for such methods is typically within the range of 2.5–3.5 gr/cc.

According to the second family of processes, exemplified by an anode proposed by Ross, U.S. Pat. No. 4,842,963, claimed to be particularly suitable for electrically rechargeable zinc/air batteries, the electrode is prepared by electrolytically depositing zinc on the internal surface of a foam electrode support to form a zinc electrode. Said patent however claims an improved zinc electrode for a rechargeable zinc-air battery comprising an outer frame, a porous foam electrode support within said frame having zinc deposited thereon and treated prior to the deposition of zinc thereon to inhibit the formation of zinc dendrites on the external surface thereof, and means within said outer frame for circulating an alkaline electrolyte through the interior of said treated zinc-coated porous foam, and a battery system which requires the inclusion of circulation means for a circulating alkaline electrolyte through the interior thereof is not practical or desirable.

At typical current densities it has been found that zinc-air batteries in which the anodes are constructed according to the above methods fail to provide a combination of rapid rechargeability, high current capacity and high peak power output. Hence it would be desirable to provide a battery with all of these attributes, i.e. high current density, high current capacity and high peak power output and which is readily, rapidly and simply rechargeable.

There have been proposals to employ zinc-air batteries for urban vehicle propulsion. An example is the following publication:

Improved slurry zinc-air systems as batteries for urban vehicle propulsion, by P. C. Foller, Journal of Applied Electrochemistry 16 (1986), 527–543.

Metal-air battery structures are described in the following publications:

U.S. Pat. No. 4,842,963, entitled Zinc Electrode and Rechargeable Zinc-Air Battery;

U.S. Pat. No. 4,147,839, entitled Electrochemical Cell with Stirred Slurry;

U.S. Pat. No. 4,908,281, entitled Metal-air Battery with Recirculating Electrolyte;

U.S. Pat. No. 4,925,744, entitled Primary Aluminum-Air Battery;

U.S. Pat. No. 3,716,413, entitled Rechargeable Electrochemical Power supply;

U.S. Pat. No. 4,925,744, entitled Primary Aluminum-Air Battery;

Electrical energy storage systems are described in the following publications:

U.S. Pat. No. 4,843,251, entitled Energy Storage and Supply Recirculating Electrolyte;

Energy on Call by John A. Casazza et al, IEEE Spectrum June, 1976, pp. 44–47.

U.S. Pat. No. 4,275,310, entitled Peak Power Generation;

U.S. Pat. No. 4,124,805, entitled Pollution-Free Power Generating and Peak Power Load Shaving System;

U.S. Pat. No. 4,797,566, entitled Energy Storing Apparatus.

U.S. Pat. No. 3,847,671, entitled Hydraulically-Refuelable Metal-Gas Depolarized Battery System, describes a metal-gas battery system constructed so that both solid and liquid content can be drained from the battery after discharge. There are provided a negative grid and a gas depolarized electrode which together define a compartment that can be refilled with a slurry of electrolyte and an active metal powder, thereby recharging the battery in a relatively short time. There is also provided means for flushing out the battery with an electrolyte solution prior to refilling with a fresh batch of slurry.

The teachings of the foregoing publications are hereby incorporated herein by reference.

As described, for example, in U.S. Pat. No. 3,847,671, the replacement of a discharged metal-based slurry in a metal-air power storage system conventionally requires pumped removal of discharged slurry from the system, and the pumping of fresh slurry into the system.

In providing batteries that are powerful enough to power relatively heavy objects such as vehicles, it is an aim to maximize the current density of the battery. In achieving this, however, metal-air battery systems are becoming of increasingly more lightweight construction and they are less able, therefore, to withstand the pressures that may be caused by the pumping of slurry, both into and out of the battery.

The following additional references describe various energy storage systems: U.S. Pat. Nos. 3,414,437; 3,647,542; 3,979,222; 3,849,202; 4,136,232; 4,166,885 and 4,517,248.

U.S. Pat. No. 4,294,891, entitled Intermittently Refuelable Implantable Bio-Oxidant Fuel Cell, describes the use of a soluble liquid fuel supported between cathode and anode assemblies each of which includes a current collector formed of expanded gold mesh.

The present invention seeks to provide an improved, rechargeable, electric battery including a central current collector element surrounded by a static mass of active metal particles saturated with a suitable electrolyte solution, utilizable as an electric fuel in a metal-gas battery wherein the static mass of particles is primarily supported by the central current collector element, thereby preserving the structural integrity of said mass.

A further aim of the invention is to provide a mechanically rechargeable electric battery cell employing a slurry containing active metal particles and an electrolyte solution, wherein the cell is mechanically rechargeable by means other than pumping.

There is provided, therefore, in accordance with an embodiment of the invention, a mechanically rechargeable electric battery having at least one electrical cell which comprises:

a pair of generally planar outer electrode means configured to define therebetween an interior space for an electrical power storage medium; and inner electrode means removable mounted between said pair of outer electrode means so as to be in electrically conductive contact with said electrical power storage medium and configured to provide mechanical support for said electrical power storage medium and to be displaceable as a unit therewith;

wherein said cell is a metal-gas battery cell and said electrical power storage medium contained in said interior space comprises a power storage slurry containing active metal particles saturated with an electrolyte solution, said pair of outer electrode means defining an opening communicating with said interior space, and said inner electrode means being configured for removal from said interior space via said opening, thereby enabling the simultaneous removal of slurry which is supported thereby from said interior space.

In a first preferred embodiment of the present invention said inner electrode means define a plurality of volumes each having a pair of open ends and each open end facing an adjacent outer electrode means wherein said plurality of volumes are configured to contain portions of said slurry.

In a second preferred embodiment said inner inner electrode means comprise a substantially planar skeletal frame comprising conductive metal having a portion of its surface area formed as open spaces, and an active zinc slurry encompassing the skeletal frame, said slurry being formed of porous zinc granules impregnated with and suspended in an electrolyte, and compacted under pressure to the skeletal frame.

There is also provided, in accordance with an additional aspect of the present invention, an anode for use in the mechanically rechargeable electric battery of the present invention, said anode comprising a substantially planar skeletal frame comprising conductive metal having a portion of its surface area formed as open spaces, and an active zinc slurry encompassing the skeletal frame, said slurry being formed of porous zinc granules impregnated with and suspended in an electrolyte, and compacted under pressure to the skeletal frame.

Additionally in accordance with the present invention there is now provided a mechanically rechargeable electric battery system comprising:

a) a mechanically rechargeable electric battery having at least one rechargeable electrical cell which comprises:

a pair of generally planar outer electrode means configured to define therebetween an interior space for electrical power storage medium; and inner electrode means removably mounted between said pair of outer electrode means so as to be in electrically conductive contact with said electrical power storage medium and configured to provide mechanical support for said electrical power storage medium and to be displaceable as a unit therewith;

wherein said cell is a metal-gas battery cell and said electrical power storage medium contained in said interior space comprises a power storage slurry containing active metal particles saturated with an electrolyte solution, said pair of outer electrode means defining an opening communicating with said interior space, and said inner electrode means being configured for removal from said interior space via said opening, thereby enabling the simultaneous removal of said slurry which is supported thereby from said interior space; and b) means for replacing a discharged volume of said electrical power storage medium with a charged volume of said electrical power storage medium which means comprise:

means for removing said inner electrode means from said interior space so as to remove from said interior space the discharged volume of the electrical power storage medium; and means for introducing inner electrode means as defined herein and supported charged electrical power storage medium into said interior space.

Further in accordance with the present invention there is provided a mechanically rechargeable electric battery system comprising:

a) a mechanically rechargeable electric battery having at least one rechargeable electrical cell which comprises:

a pair of generally planar outer electrode means configured to define therebetween an interior space for an electrical power storage medium; and inner electrode means removably mounted between said pair of outer electrode means so as to be in electrically conductive contact with said electrical power storage medium and defining a plurality of volumes each having a pair of open ends, each open end facing an adjacent outer electrode means; and means for replacing a discharged volume of said electrical power storage medium with a charged volume of said electrical power storage medium, wherein said cell is a metal-gas battery cell and said electrical power storage medium contained in said interior space comprises a bed of a power storage slurry containing active metal particles saturated with an electrolyte solution, said pair of outer electrode means defines an opening communicating with said interior space, said plurality of volumes are configured to contain portions of the bed of slurry, and said inner electrode means is configured for removal from said interior space via said opening, thereby causing the simultaneous removal of the bed of slurry from said interior space, and wherein said means for replacing a discharge volume comprises:

means for removing said inner electrode means from said interior space so as to remove therefrom the discharged volume of the electrical power storage medium;

means for immersing said inner electrode means in a body of charged slurry so as to enable the charged slurry to flow into and fill each of said plurality of volumes; and means for introducing inner electrode means as defined herein and supported charged electrical power storage medium into interior space.

In U.S. Pat. No. 4,003,753 Hall relates to high temperature rechargeable lithium batteries with molten salt electrolyte in which at least one electrode is retained in a cellular-structured current collector. The invention of said patent is substantially different from that of the present invention in that there is no provision for mechanical withdrawal of the cellular electrode following discharge, to be followed by replacement with a fresh charged electrode. In view of the very reactive nature of the cell components in Hall (electrolyte-molten halides at 240°-350° C. (see bottom of column 7) anode-lithium alloy, cathode-transition metal chalcogenide) and possibly violent reaction with air or water if exposed, it is clear that said patent can only refer to a sealed-for-life cell system with no features of charging by anode replacement, which is a critical feature of the mechanically rechargeable batteries of the present invention.

In U.S. Pat. No. 2,597,116 Marsal et al describe an air-depolarized cell with a zinc anode a (gelled) alkaline electrolyte, and an air cathode. Also in the patent the zinc anode is not designed to be mechanically replaced with a fresh anode after discharge. Furthermore, the anode (column 2, lines 22, 36) is not supported by a current collecting structure embracing the whole bulk of the anode, but is self-supporting in (perforated) sheet form, to one end of which a current collecting tab is attached.

In British Patent 1,439,756 Bant et al describe a zinc-air cell with a porous zinc powder anode compressed on a metal grid, an electrolyte comprising KOH and an air cathode. However, there is no means for mechanically replacing this anode with a charged one following discharge of the cell as in the present invention. The invention of Bant is further limited to a reserve-type single discharge operation, since the electrolyte is initially in concentrated solidified wafer form in the cell and is activated before one-shot use by adding water to the cell.

In U.S. Pat. No. 3,758,342 Baba describes a zinc-air cell with an air cathode, an alkaline electrolyte, and an anode comprising a stationary current collector over which is circulated a slurry of zinc particles in the alkaline electrolyte. It is the impingement of zinc fuel particles onto the anode collector that provides the discharge power of the cell, and the dwell time of the particles is enhanced by incorporating pocket structures in the anode current collector, that temporarily trap zinc particles adjacent to the anode. In contradistinction thereto, in the present invention the zinc is integrated in a mass of power storage medium which is either primarily supported or integrally bonded with the anode current collector, allowing the simplicity of a static electrolyte. Furthermore in Baba there is no means for mechanically removing the zinc anode from the cell following discharge to be replaced with a fresh anode.

In U.S. Pat. No. 4,950,561 Niksa describes a metal-air battery (preferred embodiment aluminum-air) with a removable anode. However it is clear from column 4, lines 19–47 of said patent that the anode of Niksa is a solid plate with both a consumable end and a hand-grasping end, the two zones being separated by a seal, and with the hand grasping end comprising usually 5–30% of the length of the plate anode (see also Example, line 16). The consumable end is generally completely dissolved into the cell electrolyte by the discharge process. The present invention describes a particulate zinc active material compressed and supported by a current collecting structure, the whole of which is immersed in the electrolyte and reacts on discharge. This whole anode structure, still retained by the current collector, and in its discharged form as zinc oxide substantially present still in solid form embraced by the current collector, is then replaced by a fresh compressed particulate zinc anode structure for subsequent discharge. Note from FIG. 7 that Niksa requires substantial system complexity e.g., flowing electrolyte through cells and an external reservoir in order to carry away the discharge products from his consumable anodes, whereas in the present invention the discharge product is contained as a solid product within the anode structure and no circulation of electrolyte is required in the system.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

The present invention will be understood and appreciated more fully from the following detailed description, taken in conjunction with the drawings in which:

FIG. 2 is a pictorial illustration of a single cell of multi-cell battery illustrated in FIG. 1;

FIG. 3 is a cross-sectional view of the battery cell illustrated in FIG. 2, taken along line A—A therein, and wherein the central current collector is constructed in accordance with a first embodiment of the invention;

FIG. 4 is an exploded view illustration of the single battery cell illustrated in FIG. 2, constructed according to the embodiment of FIG. 3;

DETAILED DESCRIPTION OF THE INVENTION

Figure 1:
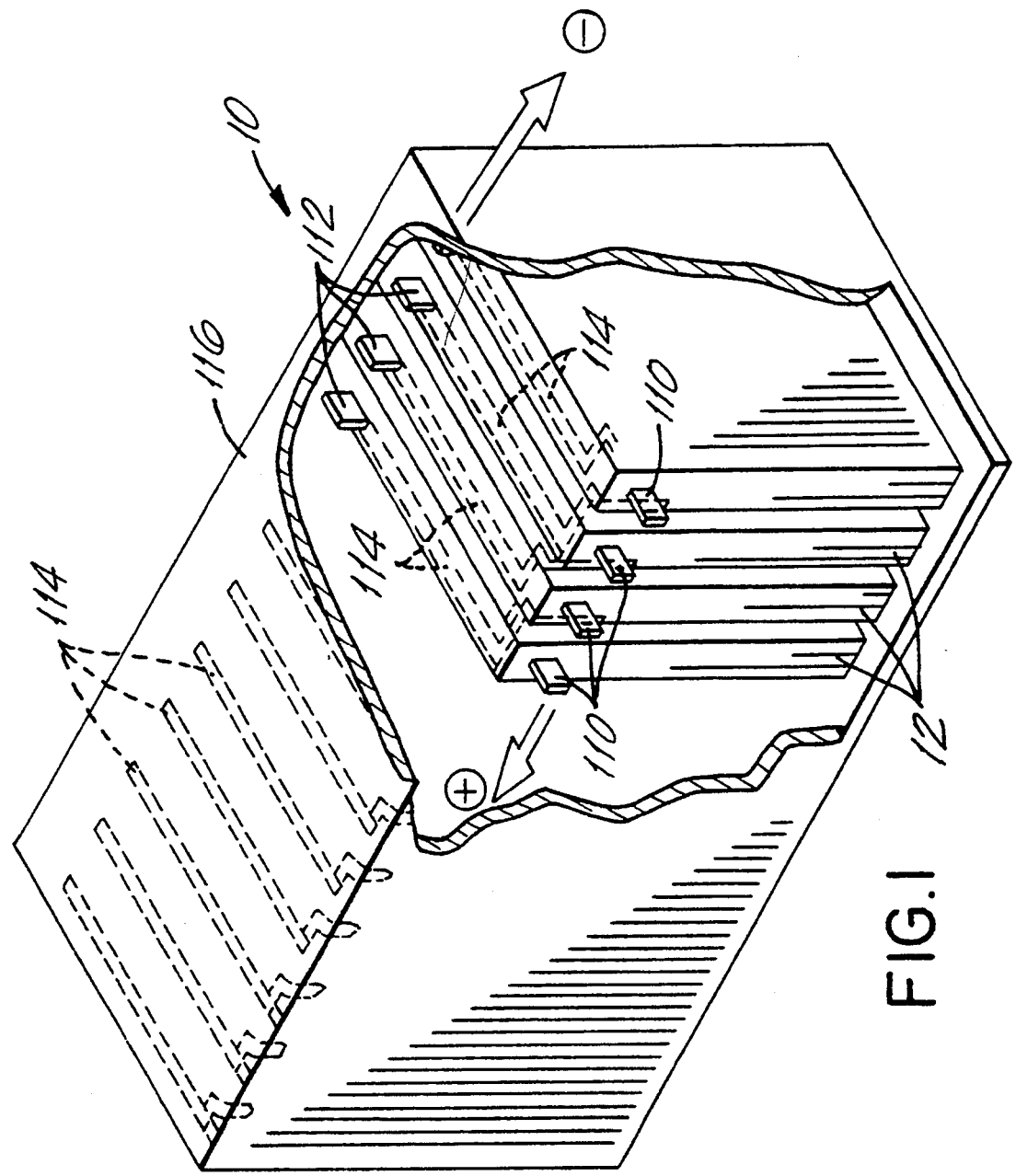
FIG. 1 is a schematic fragmented illustration of a multi-cell metal-air battery suitable for use in electric vehicles.

Referring briefly to FIG. 1, there is shown a multi-cell, rechargeable, metal-gas battery 10, containing a slurry of active metal particles and an electrolyte solution, and which is suitable for powering an electric vehicle. Battery 10 includes a stack of serially-connected electrical cells 12.

The series connection of the cells is facilitated by means of positive and negative terminals, respectively referenced 110 and 112, the positive and negative terminals of adjacent cells being interconnected, as shown, via electrically conductive pathways, reference 114, shown in FIG. 1 in hidden detail. Typically, pathways 114 are built-in to the battery housing, referenced 116.

FIG. 2 is a pictorial representation of a single battery cell, referenced generally 12, whose construction is described in detail hereinbelow.

Typically, the battery 10 is specifically a zinc-air battery employing a slurry containing a mixture of zinc particles and a suitable electrolyte solution, such as alkaline potassium hydroxide.

Referring now to FIGS. 3 and 4, there is illustrated a single battery cell 12, which includes a pair of frame members 13 (FIG. 3), typically formed of polypropylene, each supporting an associated outer electrode unit 14.

Referring now more particularly to FIG. 4, each outer electrode unit includes an outer support frame 16, an outer current collector 18, typically formed of nickel mesh; a gas electrode 20, typically an air electrode formed of a wet-proofed, catalyzed carbon layer formed on the nickel mesh; a normal separator 22, formed typically of nonwoven porous nylon, for preventing contact between the metal particles in the slurry and the gas electrode; and an inner support frame 24, similar to outer support frame 16.

In assembled form, as illustrated in FIGS. 2 and 3, top and side sealing members, referenced respectively 25 and 27 (FIG. 3), cooperate with frame members 13 (FIG. 3) which support outer electrode units 14 so as to define an interior space, referenced general 29 (FIG. 2), for storing a power storage slurry, such as described above, preferably in the form of a static bed of active metal particles saturated with a suitable electrolyte solution. The saturated static bed is indicated generally by reference numeral 26 (FIG. 2).

The active metal particles of the slurry are supported in the interior space 29 of the cell in a static bed saturated with the electrolyte solution.

A central current collector 28 is mounted within the interior space 29 of the battery cell so as to be surrounded by the saturated static bed. In the embodiments described below in conjunction with FIG. 5 the central current collector is operative to support individual portions of the static bed. This has numerous advantages, as described hereinbelow in conjunction with FIG. 5.

Figure 5:
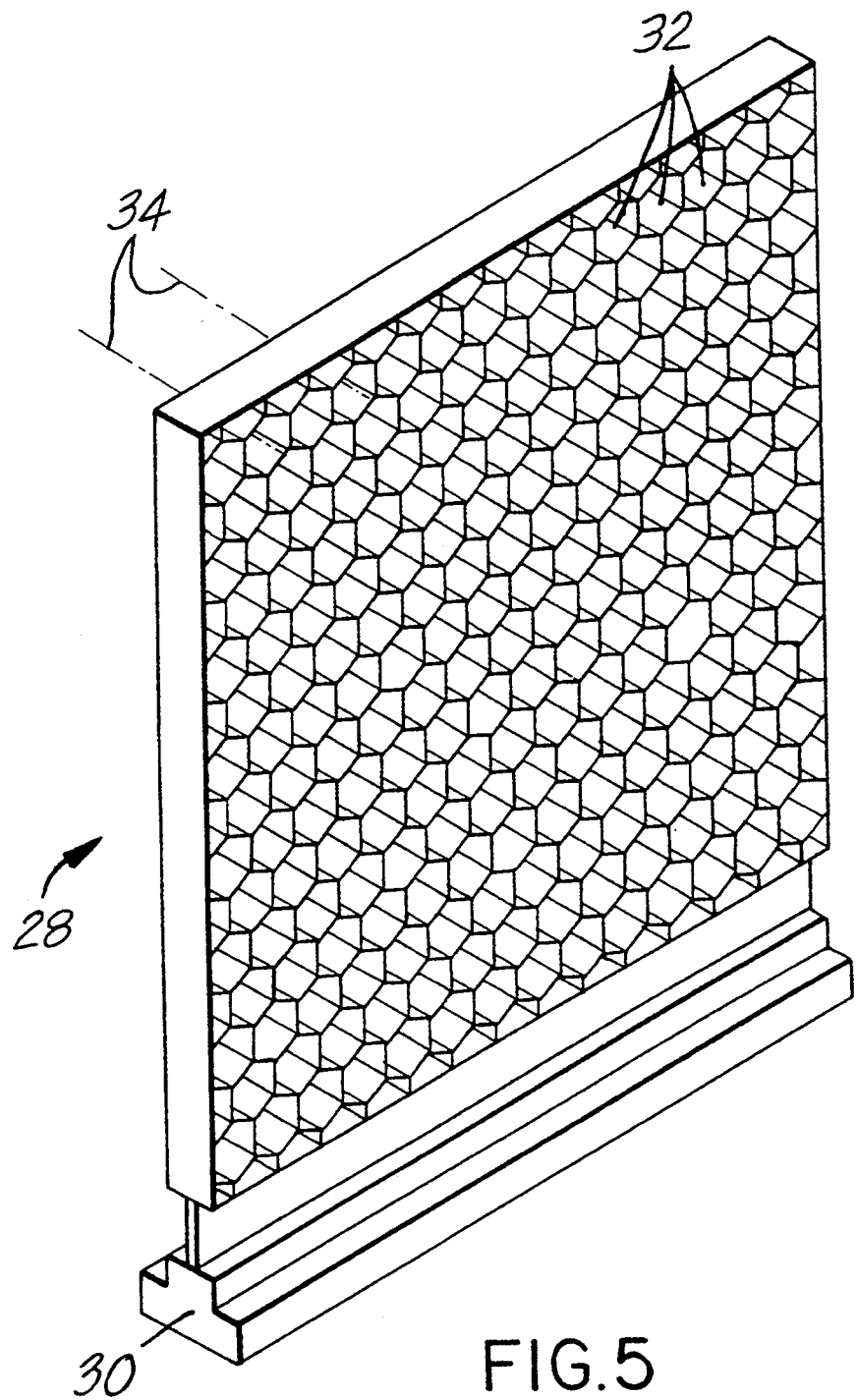
FIG. 5 is a schematic illustration of the central current collector employed in the battery cell of FIGS., 3 and 4.

Referring now also to FIG. 5, the central current collector 28 includes a base portion 30 by which the collector 28 may be removed from cell 12, so as to permit the replacement of electrically discharged slurry with an equivalent volume of charged slurry. Base portion 30 is also configured to fit together with frame members 13 so as to define a liquid-tight seal therewith. A method of slurry replacement, in which the central current collector 28 is removed and subsequently replaced, is shown and described below in detail in conjunction with FIGS. 6A-7.

As illustrated in FIG. 3, negative terminal 112, shown here in the form of a tab, is mounted within top sealing member 25 and is arranged so as to engage an adjacent electrical pathway 114 (FIG. 1). Terminal 112 protrudes downward into the interior space of the cell 12 such that when the central current collector 28 is located therewithin, an upper portion 31 of the collector engages the terminal so as to define an electrical connection therewith.

Positive terminal 110 (FIG. 1) is connected to outer current collectors 18 (FIG. 4) by any suitable means, although typically via an electrically conductive band member 33 (FIGS. 2 and 3) suitably connected to outer current collectors 18.

According to the present embodiment, central current collector 28, which may be formed of any suitable material, such as copper, steel or nickel, optionally plated with lead, tin or cadmium, has a three dimensional honeycomb-type structure.

Central current collector 28 preferably defined an array of open-ended hollow volumes 32, each having an axis of symmetry 34 (FIGS. 3 and 5). Axis of symmetry 34 extends through opposing open ends, referenced 36 and 28, and intersects with outer electrode units 14 typically at an angle of 90°.

The length of each volume 32, as measured at right angles to the outer electrode units 14, is slightly less than the width W (FIG. 3) of the interior space 29 of the battery cell 12, such that the central current collector takes up virtually the entire interior space of the battery cell.

In the present example, volumes 32 are hexagonal. Although this geometric configuration has greater mechanical strength than honeycomb arrays of alternative configurations, it is not intended to exclude the use of volumes having non-hexagonal configurations. Alternative configurations include a central current collector having circular, square, and rectangular volumes respectively.

Among some advantages of the honeycomb or cellular configuration of the central current collector 28 are the following:

1. Power storage slurry is not required to be pumped into the battery cells as with some noncellular current collectors. Instead, as will be better understood from the description below of a method of slurry replacement, volumes 32 of the central current collector are filled by simply immersing it in a bath containing charged slurry, and allowing the charged slurry to flow into the volumes. Rapid subsequent reinsertion of the central current collector into the battery cell ensures that the slurry in each of volumes 32 remains therein.

2. Obviating the need to pump slurry into the battery cells prevents unnecessary wear on the cells, in view of the fact, that the outer electrode units 14 are not mechanically strong. Furthermore, inherent in pumping is the danger of the outer electrode units 14 of respective adjacent battery cells bowing, thereby touching and causing electrical shorting. Even if shorting does not occur, merely restricting the available space between adjacent battery cells for air flow reduces the performance of the battery.

3. As the slurry becomes electrically discharged, the active metal particles thereof dissolve and/or form a solid discharge product, as known in the art. The accumulation of relatively dense solid material, together with the loss of structural integrity of the bed of metal particles, causes the particulate material in the slurry bed to slump downwards. The distribution of the slurry bed between the array of volumes 32 provides localized, mechanical support to constituent volumes of the slurry bed so as to prevent wholesale slumping of the particulate material to the bottom of the battery cell, and thus avoids further mechanical stress on the cell.

Referring now once again to FIG. 4, each outer electrode unit 14 preferably includes an 'inner' protective layer 40 arranged between normal separator 22 and central current collector 28. Typically, layer 40 is a plastic or metallic mesh which provides mechanical protection to the separator 22 upon removal and replacement of the central current collector 28. Typically, as described hereinabove, normal separator 22 is made of nonwoven porous nylon and, in the absence of protective layer 40, would thus be prone to excessive wear or even tearing after a relatively short time.

An example of protective layer 40 is an extruded plastic netting, for example, Product No. ON3330 having a strand thickness of 0.013 inches and an open area of 78% manufactured by Conwed Plastics of Belgium, and marketed under the trademark Vexar (R).

According to a further embodiment of the invention, a selective separator, referenced 42, may also be provided between normal separator 22 and air electrode 20. The selective separator, which may be a microporous sheet material of, for example, polypropylene or polyethylene, is operative to prevent contact between the gas electrode 20 and dissolved metal species in the slurry. In the present, example, therefore, the selective separator 42 is operative to prevent the dissolved zinc species $ZnO_2^=$ from travelling to the air electrode.

According to yet a further embodiment of the invention, an 'outer' protective layer 44, similar to the 'inner' protective layer 40, is provided between the air electrode 20 and the normal separator 22. When selective separator 42 is also present, the outer protective layer 44 is provided between air electrode 20 and selective separator 42. The outer protective layer 44 provides mechanical support to the separators 22 and 42 so as to prevent them from 'clinging' to the air electrode 20. This eases both the supply of air to the air electrode and also the irrigation of the slurry bed with distilled water or an electrolyte solution.

Figure 6A:
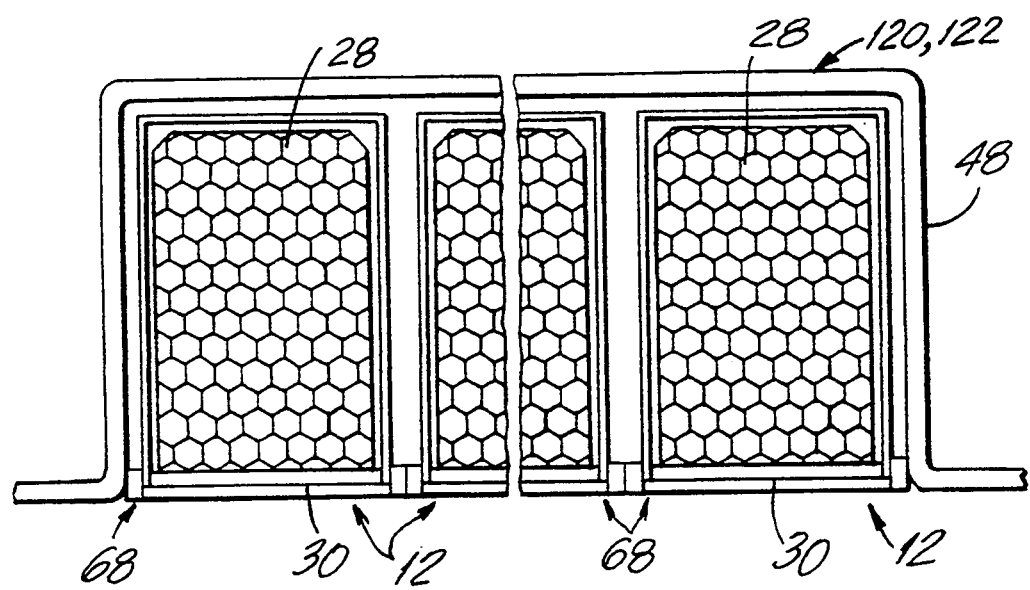
FIGS. 6A-6D are schematic illustrations of stages in the replacement of discharged slurry with charged slurry.
Figure 6B:
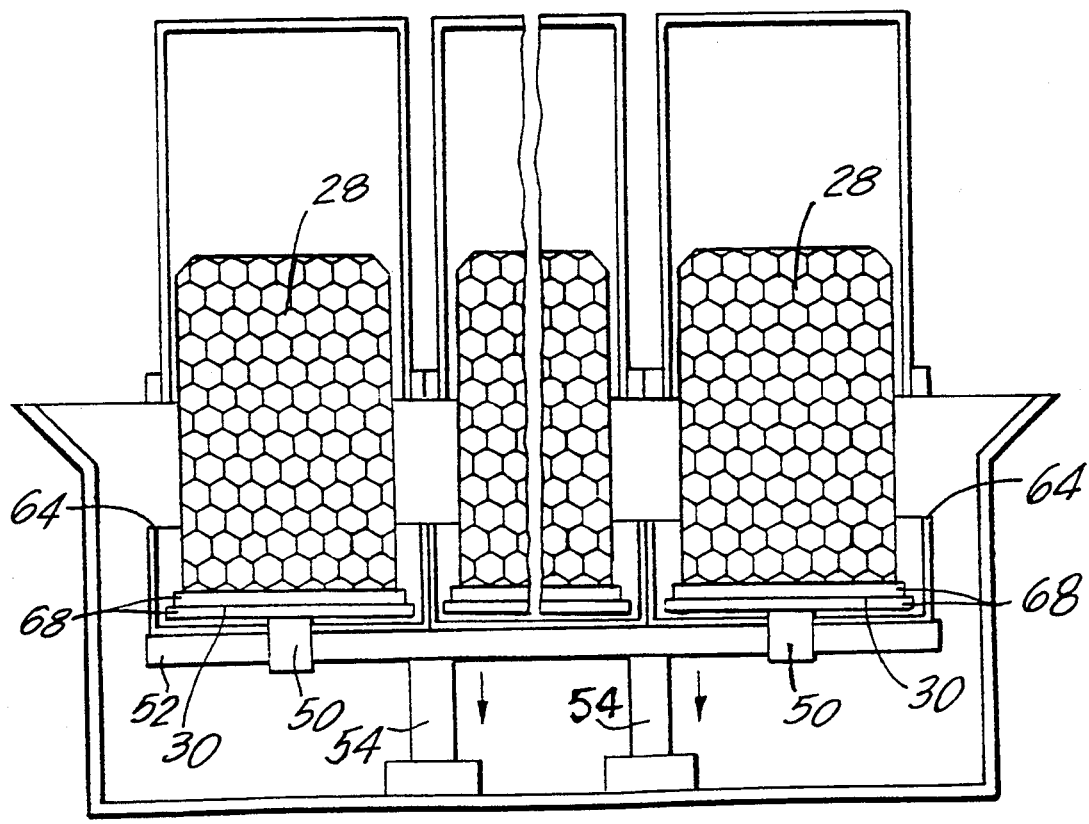
Figure 6C:
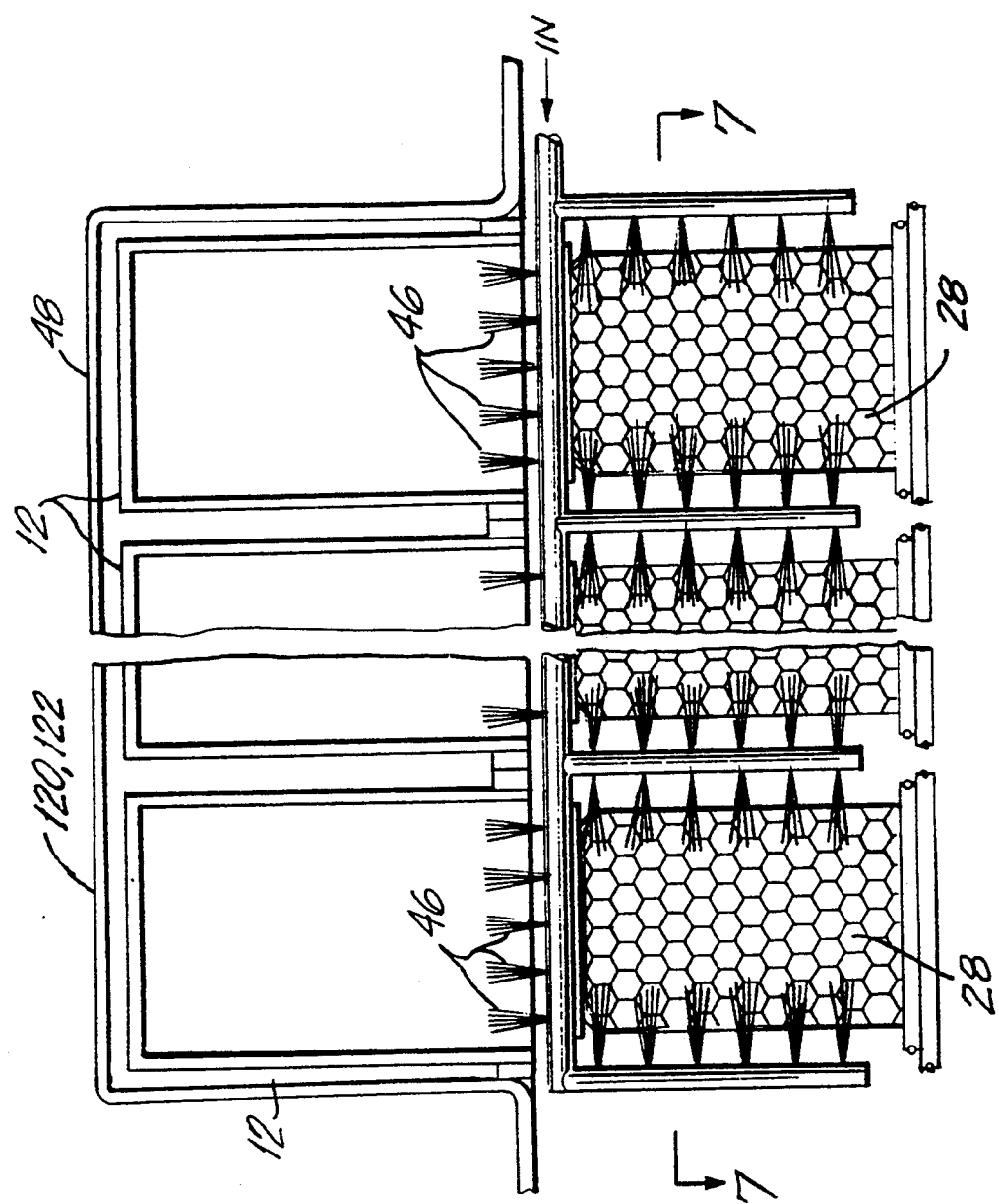
Figure 6D:
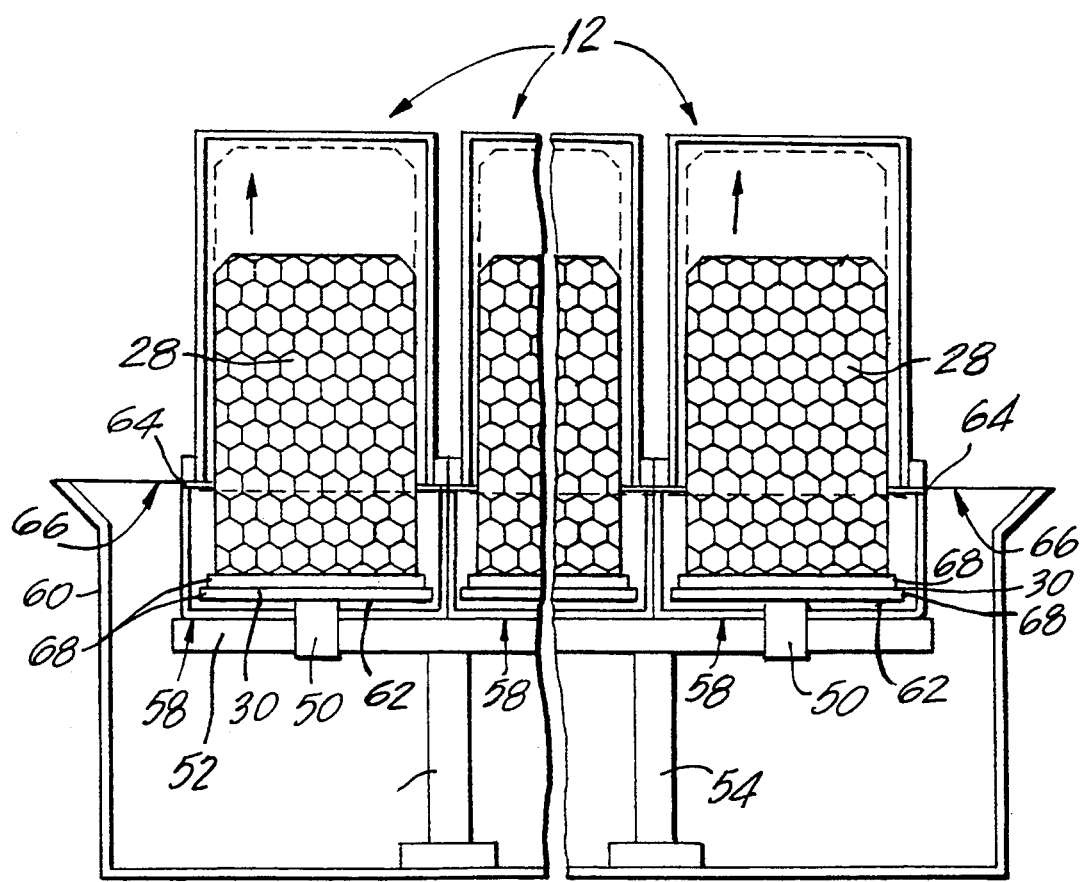
Figure 7:
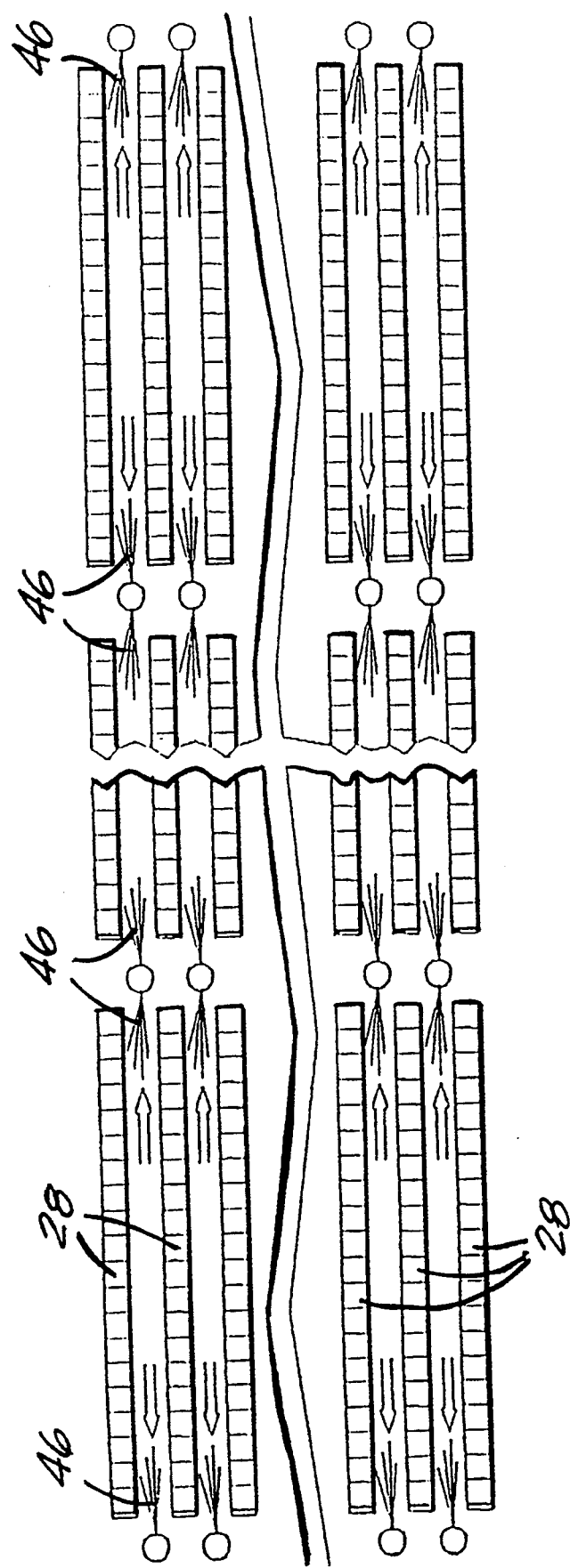
FIG. 7 is a section illustration depicting the cleaning of discharged slurry from an array of central current collectors, taken in the direction of line 7—7 in FIG. 6C.

Referring now to FIGS. 6A–7, a process of removing discharged slurry from a multi-cell battery arrangement mounted in a housing 48 of one of the battery banks 120 or 122 or the body of vehicle and subsequent cleaning and filling of each of the battery cells, is described below, in accordance with a preferred embodiment of the invention. Typically, this will be carried out at a filling station facility.

A first stage is to withdraw the central current collector 28 from each cell 12 via the central current collector base portion 30. According to one embodiment, the base portions 30 of each of the individual cells are joined or integrally formed so as to constitute a single base member, thereby facilitating the removal of all of the central current collectors simultaneously.

Referring now particularly to FIG. 6B, base portions 30 of the respective central collectors 28 are secured via first reversible actuator means 50 to a platform element 52. The platform element 52 is mounted onto second reversible actuator means 54, thereby permitting removal of the central current collectors from a plurality of battery cells simultaneously. As the bulk of the slurry adheres to the framework of current collection removal elements of the central current collectors causes simultaneous removal of the vast majority of the discharged slurry contained in said volumes and supported thereby.

Depending on the viscosity of the discharged slurry, some of it may remain on the battery cell walls and on the central current collectors 28 as they are withdrawn from the battery cells. Accordingly, as illustrated schematically in FIGS. 6C and 7, jets 46 of a fluid, typically water, KOH or air, are directed between the central current collectors so as to flush the slurry therefrom. Fluid jets may also be directed upward into the cells 12 so as to wash any residual discharged slurry therefrom.

Reference is now made to FIG. 6D, in which is illustrated the step of refilling of the cells with charged slurry. A platform element 52 supports a plurality of central current collectors 28, as shown, and has mounted thereon a plurality of baths 58. Platform element 52 is typically positioned on the floor of a housing 60 via second reversible actuator means 54.

Initially, the baths 58 are filled with a volume of charged slurry 62 containing sufficient slurry for the refilling of cells 12. In the present embodiment, wherein the central current collectors have a cellular configuration, the baths are filled to a depth such that the entire plurality of volumes 32 of the central current collectors become immersed in charged slurry so as to become filled therewith.

Subsequently, second actuator means 54 are operated so as to displace the platform element 52 upwardly toward the cells 12, until sealing gaskets 64, located on the edges of baths 58 engage a lower surface 66 of the battery bank so as to define a seal therewith. Subsequently, first actuator means 50 are operated so as to displace central current collectors 28 towards battery cells 12.

Figure 8:
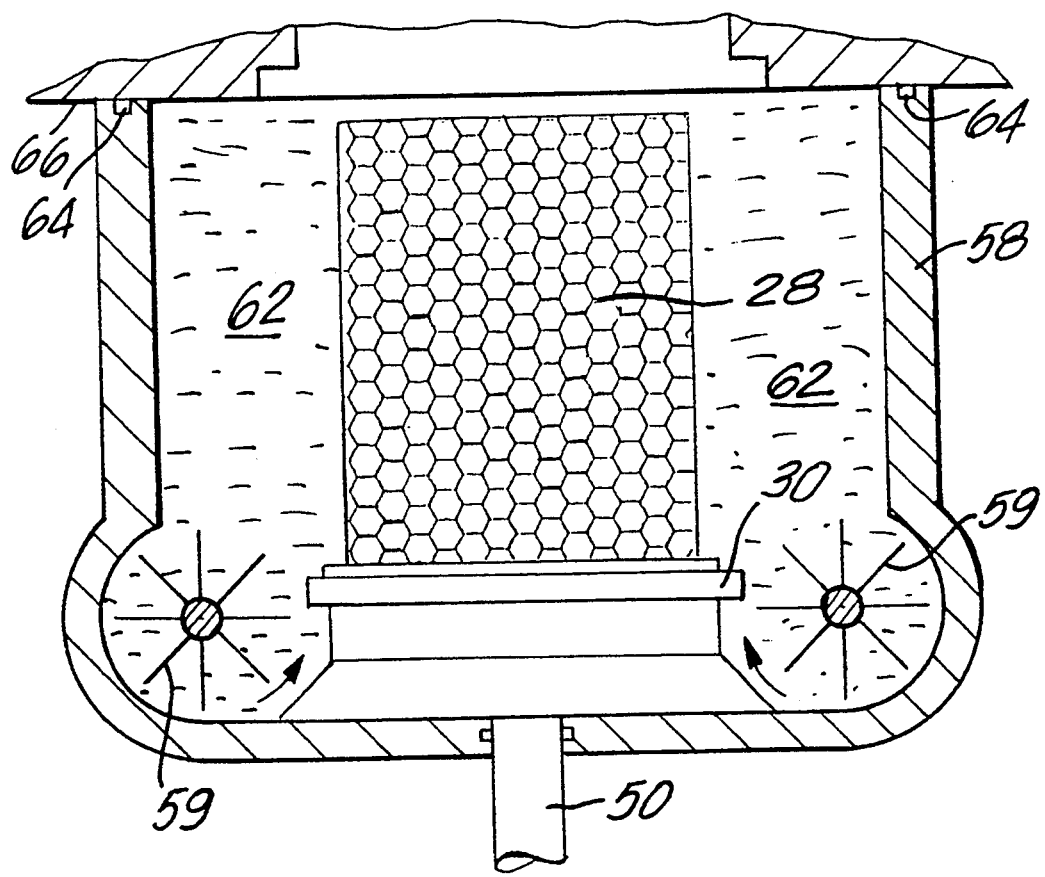
FIG. 8 is a schematic illustration of a detail of the apparatus illustrated in FIG. 6D, constructed in accordance with an alternative embodiment of the invention.

Reference is now made to FIG. 8, in which is illustrated a single bath 58, which is similar to baths 58 (FIG. 6D), except that stirrers 59 are employed so as to cause circulation of the slurry within the bath. The circulation of the slurry in this manner aids the filling of each of the individual volumes 32 of the central current collector 28. This is especially advantageous when the slurry has a relatively high viscosity.

It will be appreciated that although the described circulation is shown, in the present example, to be caused by stirrers, this is for example, only, and it may alternatively be caused by any other suitable means for vibrating or agitating the slurry.

Referring once more to FIG. 6D, baths 58 are sealed to lower surface 66 of the battery banks by means of gaskets 64 while the central current collectors 28 are reinserted, together with a fresh batch of charged slurry, into their respective cells 12. Preferably, there are also provided sealing means 68 so as to prevent leakage of slurry from cells 12 once the central current collectors 28 have been replaced therein. Suitable sealing means may be rubber gaskets, such as O-rings.

Figure 9:
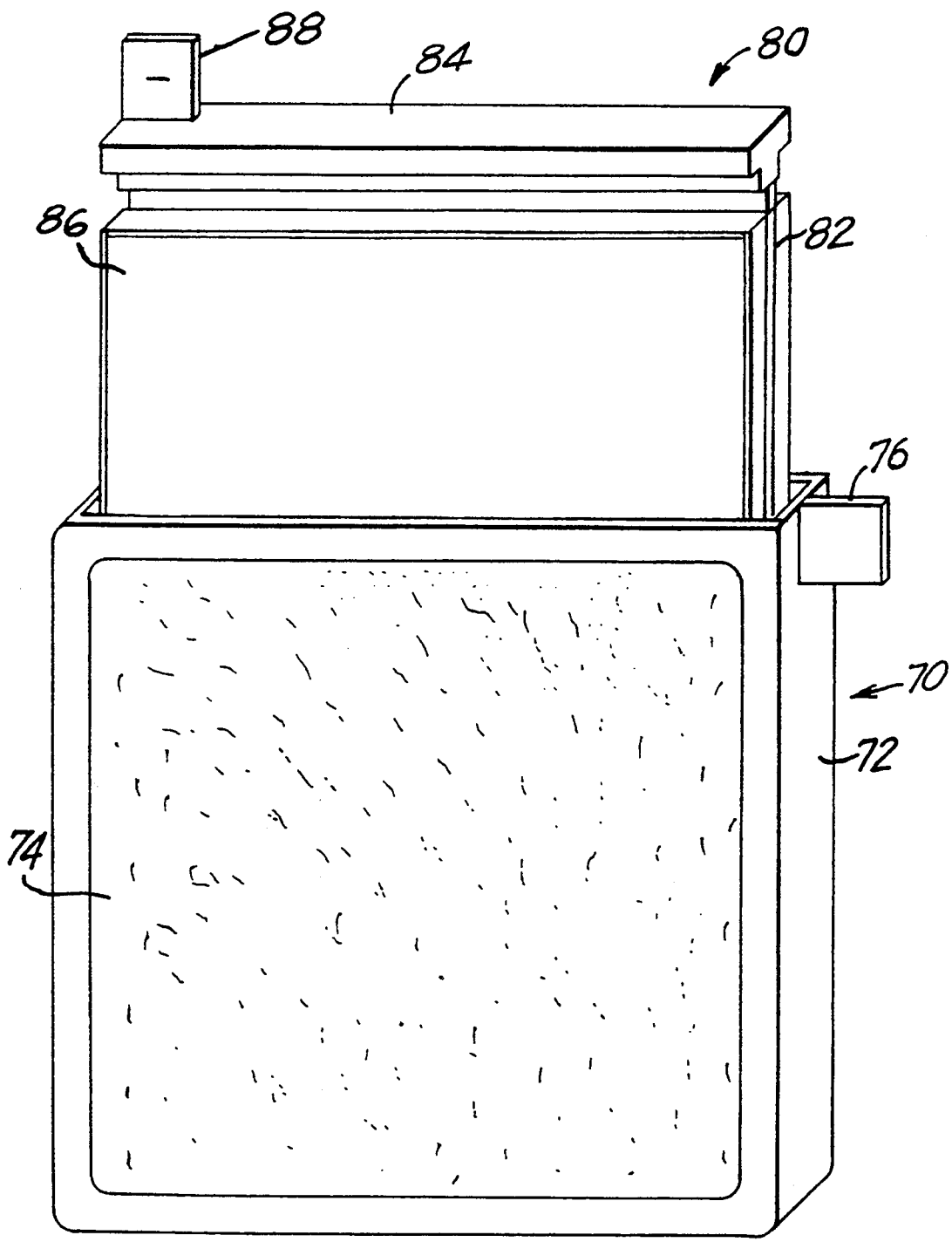
FIG. 9 is a perspective view of another preferred single cell of the multi-cell battery illustrated in FIG. 1.
Figure 10:
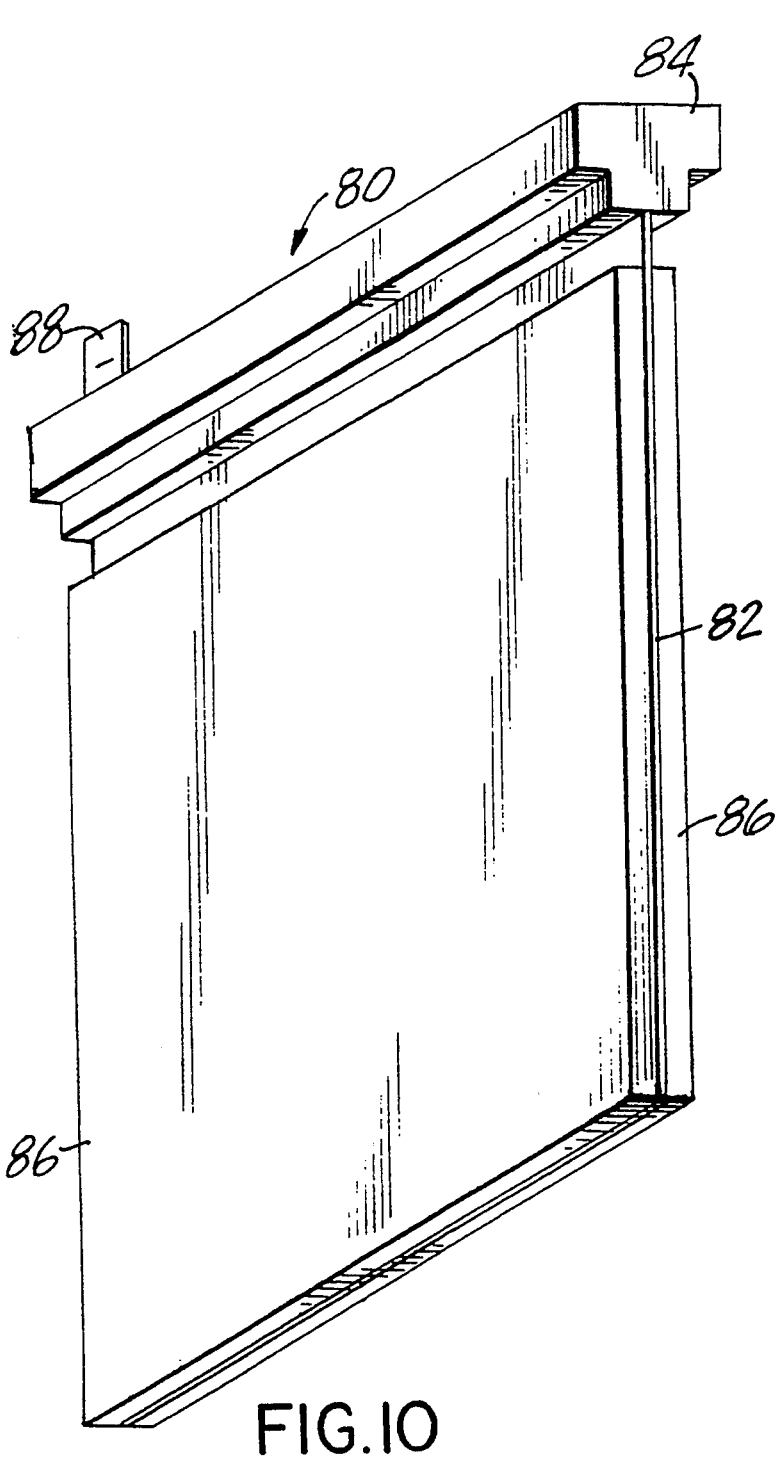
FIG. 10 is a perspective view of the prefered anode contained in the cell of FIG. 9.
Figure 11:
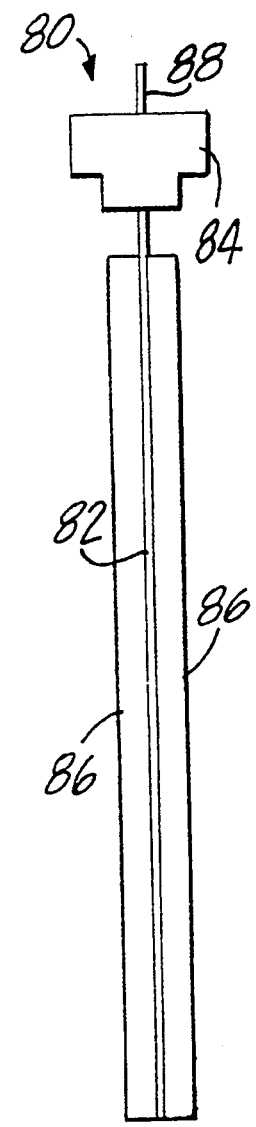
FIG. 11 is a side view of the anode of FIG. 10.

Referring now to FIG. 9 there is illustrated a single cell 70 of the multi-cell battery 10 of FIG. 1.

The cell 70 generally comprises a housing 72 formed of a corrosion resistant material, suitably polypropylene plastic. Part of the sides of housing 72 are removed. An air cathode 74 having a metallic support screen, an air permeable but liquid impermeable waterproofing layer, and an oxygen reduction catalyst, typically carbon based, is fitted to at least one of the sides of housing 72 to form a liquid tight compartment. A positive electrical contact terminal 76 is provided.

The cell 70 additionally comprises a replaceable planar metal anode, generally denoted 80, comprising a skeletal frame 82, a sealing crown 84, an active zinc anode element 86, and a negative electrical contact 88 as will be described in greater detail below. A set of protective screens (not shown) comprising physical separators and optionally ion selective membranes are either fixed in the cell or attached to the sides of the anode to form a removable cassette unit. Crown 84 is constructed so that upon insertion of anode 80 into housing 72 a liquid-tight compartment is formed.

In operation, anode 80 and a suitable electrolyte are positioned in housing 72. When placed under electric load, the electrolyte completes an electric current producing circuit between the air electrode 74 and the zinc anode 80. Once the active zinc material is expended, anode 80 is readily removed and replaced by a new anode comprising fresh active material.

Figure 12:
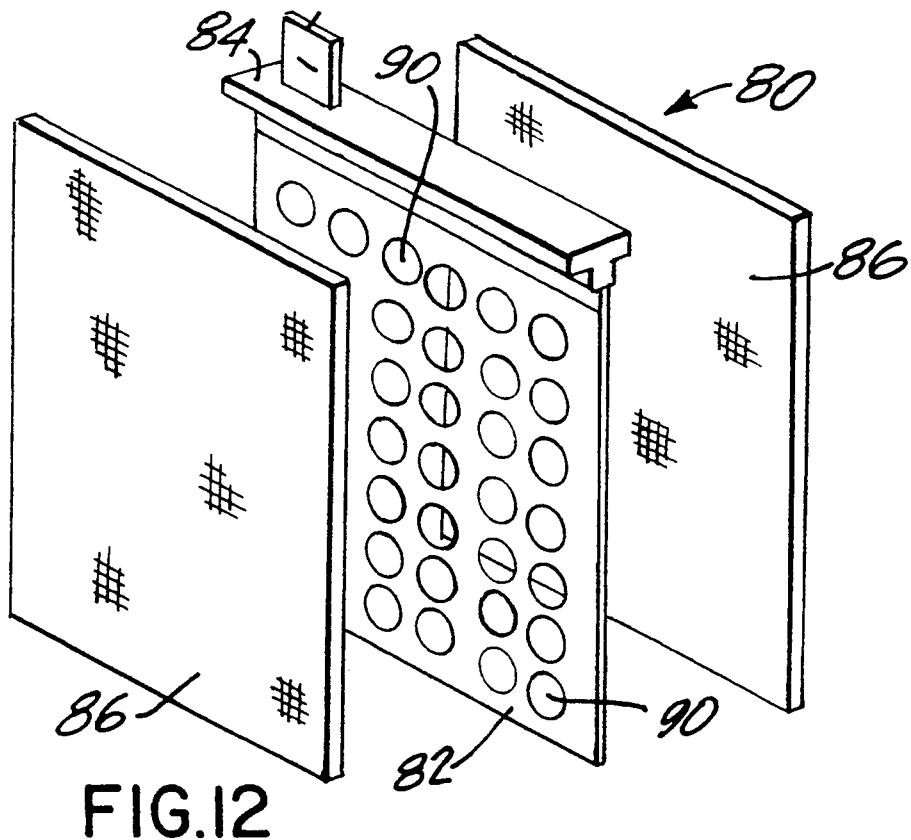
FIG. 12 is an exploded view of the anode of FIG. 10 according to one embodiment of the invention.

As best seen in FIG. 12, the skeletal frame 82 is suitably a generally planar sheet of a conductive metal, for example copper, nickel, titanium, or steel, optionally coated with tin, lead, cadmium, silver or their alloys, and formed with a plurality of open areas or holes 90. Holes 90 constitute at least 50% of the surface area of the face of the skeletal frame 82. It should be understood that skeletal frame 82 may have various configurations not necessarily limited to a planar sheet, such as those derived from woven filaments, expanded mesh, or a cellular structure such as the honeycomb of FIG. 5. The holes 90 may be introduced by any known processes, including punching, cutting, drilling, weaving, or casting the material from which frame 82 is formed.

Figure 13:
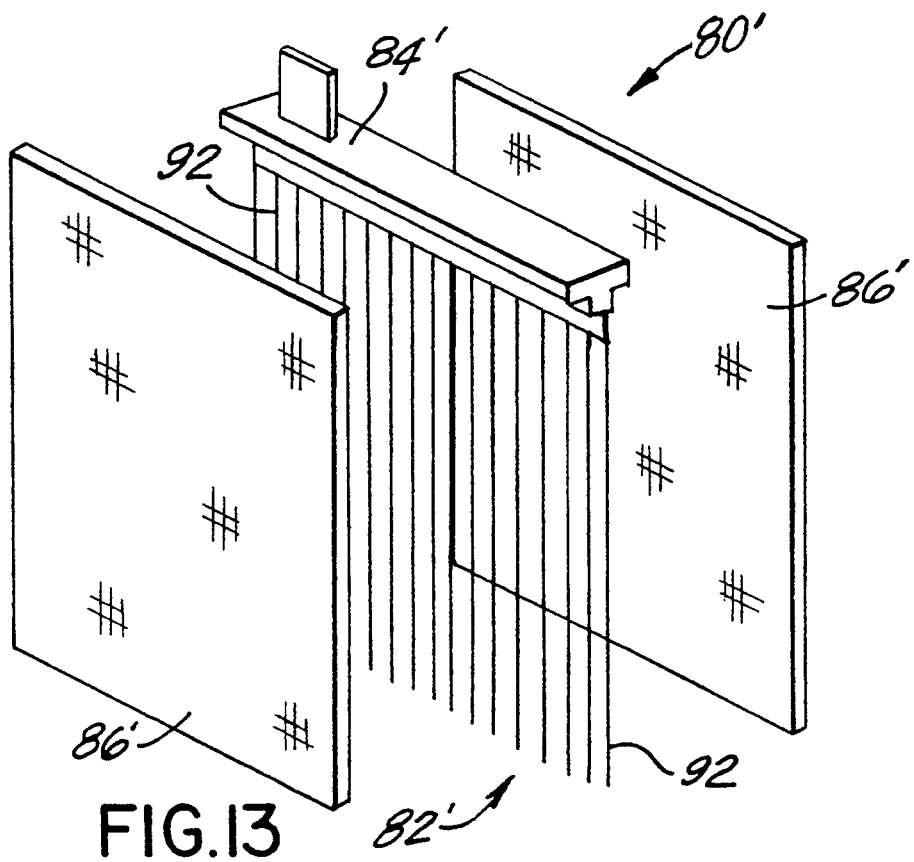
FIG. 13 is an exploded view of a second embodiment of the anode of FIG. 10.

Alternatively, as illustrated in FIG. 13, the skeletal frame 82' may be comprised of a series of rigid rods or protrusions 92 projecting from the crown 84' as illustrated. The rods or protrusions 92 may be suitably constructed of any of the conductive metals mentioned above. As a weight saving feature, the rods 92 alternatively may be formed of inert plastics, suitably polypropylene, nylon or polyvinylchloride, optionally all or some of which are coated with the said conductive metals. A combination of metal and plastic rods may be incorporated as well.

The active anode element 86 (or 86') is formed from a slurry of porous zinc granules impregnated with and suspended in any suitable electrolyte. The slurry is cold-compacted under pressure at room temperature until adherence of the granules into a rigid static bed of active anode material is achieved. Slurry prepared from porous granules comprising zinc, impregnated with and suspended in an electrolyte comprising an aqueous solution of a hydroxide of a group Ia metal, and optionally including inorganic corrosion inhibitors (e.g. PbO, CdO, ZnO, HgO, $In_2O_3$, SnO or a combination thereof), organic corrosion inhibitors (e.g. phosphate esters or tetramethyl ammonium hydroxide), gelling agents (e.g. carboxymethyl cellulose), electrolyte extenders (e.g. sodium silicate), filler (e.g. graphite) and labelling agents (e.g. cresol red), produced according to the teachings of our copending European Patent application (hereby incorporated by reference), has been found to be particularly suitable.

It is this use of a highly porous anodic material compacted to a state of tight interparticulate structure, but still more porous than known-in-the-art zinc anode precursors that provides for the combined attributes of high energy density, while at the same time providing high current capacity and high peak power.

Figure 14:
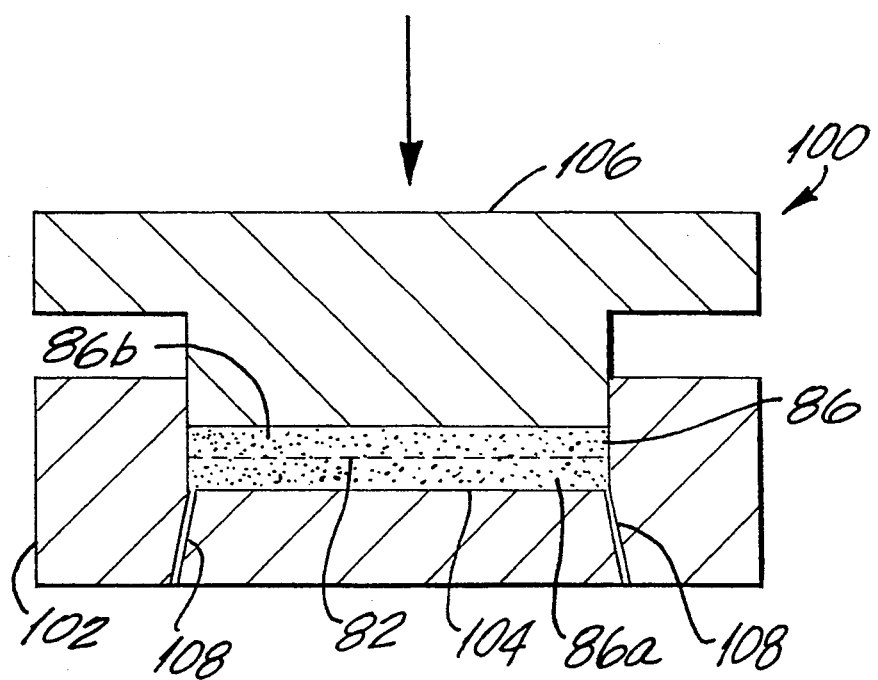
FIG. 14 is a schematic cross section of a die-press used in the production of the anode of FIGS. 12 or 13.

A die-press 100 for compacting the anode 86 (or 86') including a lower layer 86a and an upper layer 86b is illustrated in FIG. 14. The die comprises a lower female member 102, having a recess 104 and a mating upper male member 106. Channels 108 are provided to allow for the run-off of excess electrolyte when the slurry is compacted. It should be understood to those skilled in the art that many forms of die presses may be used, and the die press illustrated should be considered merely exemplary.

The open spaces provided in the skeletal frame 82, i.e. holes 90 in collector 86 and the gaps between the rods or protrusions of collector 86' are highly important and serve a three-fold purpose. First, the spaces in the skeletal frame foster the adherence of the slurry bed on both sides of the skeletal frame thus forming a unitary plate.

Secondly, at the area proximate to the holes, the slurry bed has a greater depth relative to the cathode, thus increasing the current production capabilities of the cell; the more open space the greater the effective depth of the active anode element 86, and therefore a greater theoretical power. Finally, the open spaces facilitate separation of the active anode element 86 therefrom for recycling of the anodic material in anode element 86 for later reuse. The embodiment illustrated in FIG. 13 has been found particularly promising in this respect since the anode bed may be readily pulled off the straight protrusions 92 forming the skeletal frame 82'.

As understood, production of electricity results in oxidation of the active anodic material in anode element 86 to a less conductive oxide state. However, where a highly porous conductive anode material is employed, for example zinc produced according to our said copending European Pat. Application, so long as there remains at least 10% zinc (no greater than 90% oxide) in the active anode element, the reduced surface area of the skeletal frame 82 (or 82') resulting from holes 90, open spaces between protrusions 92, or from partial incorporation of non-electrically-conductive protrusions, has not been found to impair the current producing performance of the cell.

Preparation of anode 80 (or 80') is effected as follows: First the skeletal frame 82 (or 82') is formed and a slurry of active anodic material for the active anode element 86 is prepared. The granules of a suitable slurry of zinc and optional additives as described above, have an initial density of zinc of between 0.2 and 2.0 gr/cc and an active surface area of between 0.5–6.0 m$^2$/gr and are impregnated with and suspended in electrolyte suitably comprising an aqueous solution of hydroxides of a group Ia metal, e.g. KOH. Optional additives as noted above may be included in the slurry.

A first layer 86a of slurry of active anodic material for the active anode element 86 is layered into the recess 104 of female die-press member" 102. The skeletal frame 82 (82') is placed over the first layer, and thereover a second layer 86b of active anodic material. Alternatively, the slurry may be first layered into recess 104, and skeletal frame 82 (82') then introduced before compacting.

The slurry layers of the active anodic material and skeletal frame are compacted at room temperature under the male member 106, the pressure applied being within the range of 1.0–15.0 kg/cm$^2$ the excess electrolyte being allowed to run off through channels 108. Compacting is effected until the active anode 86 forms a rigid plate, the slurry being adherent to itself and to the skeletal frame 82 and typically having a density in the range of 0.5–3.0 gr/cc.

Figure 15:
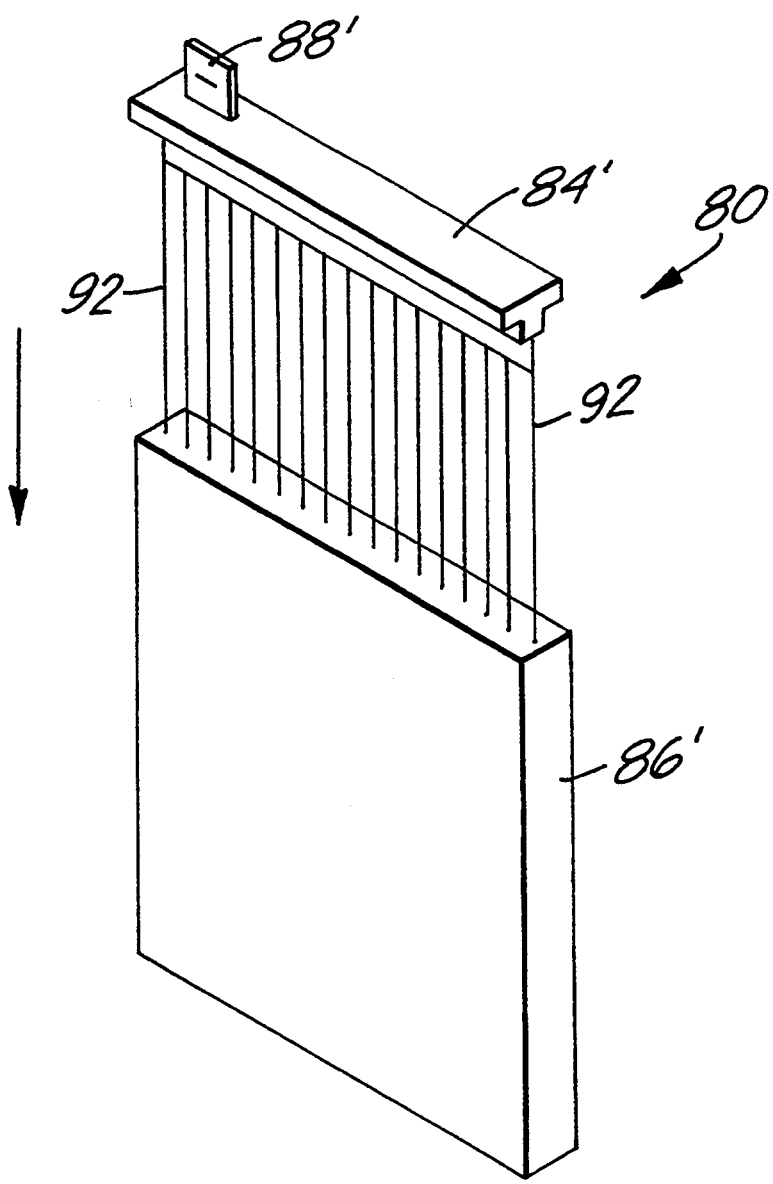
FIG. 15 is a schematic illustration of an alternative method for producing the anode of FIG. 13.

By an alternative method, the anode 80' may be constructed as follows. A thick layer of slurry is inserted into recess 104 of the female member 102, and the slurry bed is then compacted as noted above until a static bed of slurry 86' is formed. The skeletal frame 82' formed of rods or protrusions 92 is inserted into the center of the static bed 86' either prior to, or, as illustrated in FIG. 15, after compacting to form the anode.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A mechanically rechargeable electric battery having at least one electrical cell which comprises:
    a pair of planar outer electrode means configured to define therebetween an interior space for containing an electrical power storage medium; and
    inner electrode means comprising a current collecting structure removably mounted between said pair of outer electrode means so as to be in electrically conductive contact with said electrical power storage medium and configured to provide mechanical support for said electrical power storage medium and is mechanically removable as a unit therewith from said interior space;
    wherein said cell is a zinc-air battery cell and said electrical power storage medium contained in said interior space comprises a power storage slurry containing active porous zinc particles saturated with an electrolyte solution, said pair of outer electrode means defining an opening communicating with said interior space, and said inner electrode means being configured for mechanical withdrawal from said interior space via said opening so as to enable a simultaneous removal of said current collecting structure and of discharged particulate zinc slurry which is supported thereby from said interior space and a replacement of said current collecting structure and said zinc slurry, via said opening, with a freshly charged inner electrode means.

2. A mechanically rechargeable electric battery according to claim 1 wherein said inner electrode means define a plurality of volumes each having a pair of open ends and each open end facing an adjacent outer electrode means wherein said plurality of volumes are configured to contain portions of said slurry.

3. A mechanically rechargeable electric battery according to claim 1 wherein said inner electrode means comprise a substantially planar skeletal frame comprising conductive metal having a portion of its surface area formed as open spaces, and an active zinc slurry encompassing the skeletal frame, said slurry being formed of porous zinc granules impregnated with and suspended in an electrolyte, and compacted under pressure to the skeletal frame.

4. An anode for use in a mechanically rechargeable electric battery according to claim 3, said anode comprising a substantially planar skeletal frame comprising conductive metal having a portion of its surface area formed as open spaces, and an active zinc slurry encompassing the skeletal frame, said slurry being formed of porous zinc granules impregnated with and suspended in an electrolyte, and compacted under pressure to the skeletal frame.

5. A mechanically rechargeable electric battery system comprising:
    a) a mechanically rechargeable electric battery having at least one rechargeable electrical cell which comprises:
        a pair of generally planar outer electrode means configured to define therebetween an interior space for an electrical power storage medium; and inner electrode means removably mounted between said pair of outer electrode means so as to be in electrically conductive contact with said electrical power storage medium and configured to provide mechanical support for said electrical power storage medium and to be displacable as a unit therewith;

wherein said cell is a metal-gas battery cell and said electrical power storage medium contained in said interior space comprises a power storage slurry containing active metal particles saturated with an electrolyte solution, said pair of outer electrode means defining an opening communicating with said interior space, and said inner electrode means being configured for removal from said interior space via said opening, thereby enabling the simultaneous removal of said slurry which is supported thereby from said interior space; and b) means for replacing a discharged volume of said electrical power storage medium with a charged volume of said electrical power storage medium which means comprise:

means for removing said inner electrode means from said interior space so as to remove from said interior space the discharged volume of the electrical power storage medium; and means for introducing inner electrode means as defined herein and supported charged electrical power storage medium into said interior space.

6. A mechanically rechargeable electric battery system comprising:

a) a mechanically rechargeable electric battery having at least one rechargeable electrical cell which comprises:

a pair of generally planar outer electrode means configured to define therebetween an interior space for an electrical power storage medium; and inner electrode means removably mounted between said pair of outer electrode means so as to be in electrically conductive contact with said electrical power storage medium and defining a plurality of volumes each having a pair of open ends, each open end facing an adjacent outer electrode means; and means for replacing a discharged volume of said electrical power storage medium with a charged volume of said electrical power storage medium, wherein said cell is a metal-gas battery cell and said electrical power storage medium contained in said interior space comprises a bed of a power storage slurry containing active metal particles saturated with an electrolyte solution, said pair of outer electrode means defines an opening communicating with said interior space, said plurality of volumes are configured to contain portions of the bed of slurry, and said inner electrode means is configured for removal from said interior space via said opening, thereby causing the simultaneous removal of the bed of slurry from said interior space, and wherein said means for replacing a discharge volume comprises:

means for removing said inner electrode means from said interior space so as to remove therefrom the discharged volume of the electrical power storage medium;

means for immersing said inner electrode means in a body of charged slurry so as to enable the charged slurry to flow into and fill each of said plurality of volumes; and means for introducing inner electrode means as defined herein and supported charged electrical power storage medium into interior space.

* * * * *